US012139051B2

(12) United States Patent
Suzuki et al.

(10) Patent No.: US 12,139,051 B2
(45) Date of Patent: Nov. 12, 2024

(54) REAR SEAT ASSEMBLY FOR A VEHICLE

(71) Applicant: Honda Motor Co., Ltd., Tokyo (JP)

(72) Inventors: Junichi Suzuki, Royal Oak, MI (US); Fernando M Rosero, Rochester Hills, MI (US); Eric D Daume, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 17/586,330

(22) Filed: Jan. 27, 2022

(65) Prior Publication Data
US 2023/0286421 A1   Sep. 14, 2023

(51) Int. Cl.
*B60N 2/20* (2006.01)
*B60H 3/06* (2006.01)
*B60K 1/04* (2019.01)
*B60L 50/60* (2019.01)
*B60N 3/00* (2006.01)

(52) U.S. Cl.
CPC ............. *B60N 2/20* (2013.01); *B60H 3/0608* (2013.01); *B60K 2001/0416* (2013.01); *B60L 50/66* (2019.02); *B60N 3/004* (2013.01); *B60N 2205/35* (2013.01)

(58) Field of Classification Search
CPC ...... B60N 2/20; B60N 2/3081; B60N 2/3084; B60N 2/3086; B60R 5/006
See application file for complete search history.

(56) References Cited

U.S. PATENT DOCUMENTS

| | | | |
|---|---|---|---|
| 6,199,252 B1 * | 3/2001 | Masters ............... | B60N 2/5891 297/218.3 |
| 7,252,319 B2 | 8/2007 | Toyota et al. | |
| 7,743,863 B2 | 6/2010 | Shindou | |
| 8,353,550 B1 | 1/2013 | Lucas | |
| 8,801,073 B1 | 8/2014 | Gray, Jr. et al. | |
| 8,833,833 B2 | 9/2014 | Jeong et al. | |
| 9,731,636 B1 | 8/2017 | Takeuchi et al. | |
| 2018/0257527 A1 * | 9/2018 | Caye ......................... | B60N 2/36 |
| 2023/0107157 A1 * | 4/2023 | Suzuki ................. | B60N 2/2222 297/378.1 |

FOREIGN PATENT DOCUMENTS

| | | | | |
|---|---|---|---|---|
| CN | 101372205 A | 2/2009 | | |
| DE | 3000078 C2 * | 9/1991 | ............. | B01D 53/86 |
| EP | 0940289 A2 * | 9/1998 | ............. | B20N 2/757 |
| GB | 826078 A | 12/1959 | | |
| WO | WO-9728019 A1 * | 8/1997 | ............... | B60N 2/36 |

* cited by examiner

Primary Examiner — Daniel J Colilla
(74) Attorney, Agent, or Firm — Mark Duell; American Honda Motor Co., Inc.

(57) ABSTRACT

A seat assembly for a vehicle having a vehicle body includes a seat bench adapted to be arranged inside the vehicle body and defines a passenger compartment and a service compartment inside the vehicle body. The seat bench includes a seat bottom to facilitate a seating of a one or more passengers, and a back support. The back support has a first support panel adapted to move between an upright position and a folded position relative to the seat bottom, and a second support panel arranged proximate to the seat bottom and removably coupled to the first support panel and the seat bottom. The first support panel is moved to the folded position from the upright position upon a disengagement of the second support panel from the first support panel and the seat bottom to provide an access of the service compartment.

11 Claims, 10 Drawing Sheets

REAR SEAT ASSEMBLY FOR A VEHICLE

BACKGROUND

The disclosed subject matter relates generally to a rear seat assembly for a vehicle. More particularly, the disclosed subject matter relates a rear seat assembly adapted to be used as a service door for accessing one or more components of the vehicle arranged rearwardly of the rear seat assembly.

Vehicles such as, electric vehicles and hybrid-electric vehicles, typically include a high-voltage battery, or multiple batteries, that are too large to be packaged in an engine compartment, and therefore are often packaged elsewhere in the vehicle. For conventional vehicles, in order to make effective use of the cabin space and to improve safety in a collision, the layout is usually such that the battery is arranged below the rear seat (i.e., the second row of seats for vehicles). However, in conventional vehicles, the rear seat is fixedly attached to the vehicle body. Consequently, when battery pack maintenance or replacement operations are to be performed, a technician cannot access the battery pack unless the rear seat are temporarily removed, making the operation difficult and inefficient.

SUMMARY

In accordance with one embodiment of the present disclosure, a seat assembly for a vehicle having a vehicle body is provided. The seat assembly includes a seat bench adapted to be arranged inside the vehicle body and defining a passenger compartment and a service compartment inside the vehicle body. The seat bench includes a seat bottom to facilitate a seating of a one or more passengers, and a back support. The back support has a first support panel adapted to move between an upright position and a folded position relative to the seat bottom, and a second support panel arranged proximate to the seat bottom and removably coupled to the first support panel and the seat bottom. The first support panel is moved to the folded position from the upright position upon a disengagement of the second support panel from the first support panel and the seat bottom to provide an access of the service compartment.

In accordance with another embodiment of the present disclosure, a vehicle is provided. The vehicle includes a vehicle body and a seat bench arranged inside the vehicle body and defining a passenger compartment and a service compartment inside the vehicle body. The seat bench includes a seat bottom to facilitate a seating of a one or more passengers, and a back support. The back support has a first support panel adapted to move between an upright position and a folded position relative to the seat bottom, and a second support panel arranged proximate to the seat bottom and removably coupled to the first support panel and the seat bottom. The first support panel is moved to the folded position from the upright position upon a disengagement of the second support panel from the first support panel and the seat bottom to access the service compartment.

In accordance with yet a further embodiment of the present disclosure a vehicle is provided. The vehicle includes a vehicle body, and a seat bench arranged inside the vehicle body and defining a passenger compartment and a service compartment inside the vehicle body, The seat bench includes a seat bottom to facilitate a seating of a one or more passengers, and a back support. The back support has a first support panel adapted to move between an upright position and a folded position relative to the seat bottom, and a second support panel arranged proximate to the seat bottom and removably coupled to the first support panel and the seat bottom. The vehicle further includes a plurality of components arranged inside the service compartment and a plurality of first fasteners removably coupling the second support panel with the first support panel arranged at the upright position and the seat bottom. Moreover, the vehicle also includes a plurality of second fasteners coupling the first support panel in the upright position with the vehicle body. The plurality of second fasteners is disengaged from the first support panel and the vehicle body to move the first support panel to the folded position. Also, the first support panel is moved to the folded position from the upright position after disengaging the second support panel from the first support panel and the seat bottom to access the components arranged inside the service compartment.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-10, wherein like numbers indicate the same or corresponding elements throughout the views.

Figure 1:
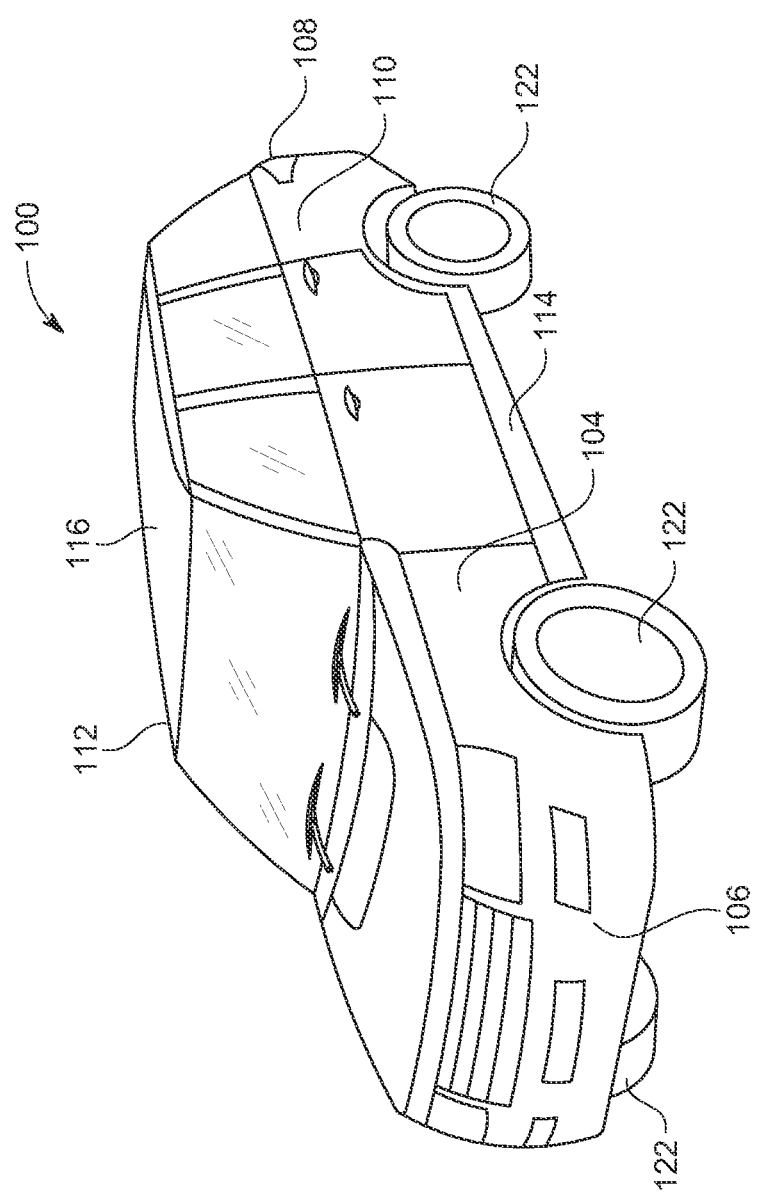
FIG. 1 is a front perspective view of a vehicle, in accordance with one embodiment of the present disclosure.

FIG. 1 illustrates a front perspective view of a vehicle 100 having a seat assembly, for example, a rear seat assembly 102 (best shown in FIG. 2 and FIG. 3), in accordance with one embodiment of the disclosure. In an embodiment, the vehicle 100 may be an autonomous vehicle and is shared between multiple users. However, the vehicles in accordance with alternative embodiments can comprise any variety of vehicles, including automobiles, trucks, vans, recreational vehicles, utility vehicles, agricultural equipment, or construction equipment, for example. The vehicle 100 may include a vehicle body 104 having a front end 106, a rear end 108, a first longitudinal side 110 (hereinafter referred to as a left side 110), a second longitudinal side 112 (hereinafter referred to as a right side 112). The vehicle body 104 supports various components and/or assemblies of the vehicle 100. The vehicle body 104 may include a floor 114, a roof 116, and a plurality of pillars extending from the floor 114 to the roof 116. The vehicle 100 includes an engine module (not shown) having an engine and a transmission assembly operatively connected to the engine and adapted to transmit power from the engine to a plurality of traction members 122, such as wheels, of the vehicle 100. In an embodiment, the engine may be an internal combustion engine or an electric motor, of any suitable size and configuration for providing a motive power to the vehicle 100. In one embodiment, the engine module may be supported by the vehicle body 104 at a location behind the rear seat assembly 102 of the vehicle 100. However, in alternative embodiments, the engine module may be located at a central or front portion of the vehicle 100. Also, the vehicle 100 may include a plurality of components 200, for example, a cabin filter 202, a battery 204 etc., arranged behind the rear seat assembly 102.

Figure 2:
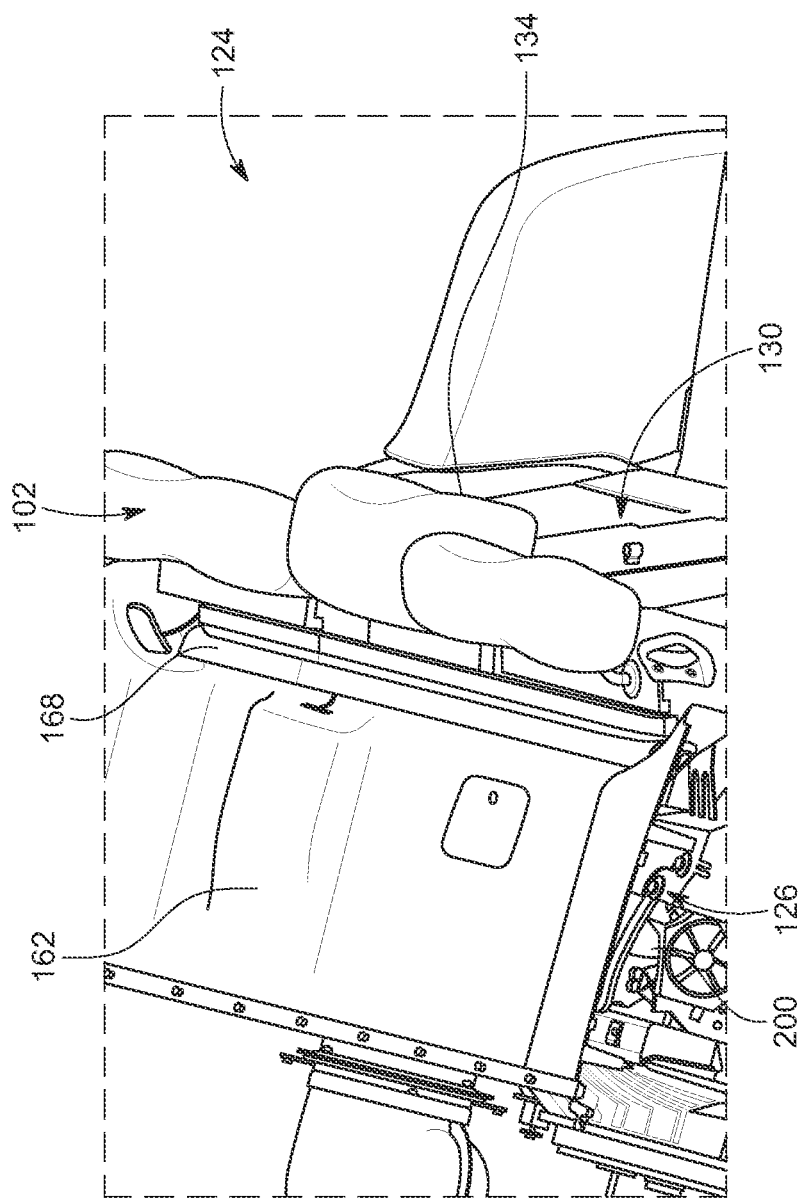
FIG. 2 is top perspective view of an interior of the vehicle depicting a rear seat assembly arranged inside a vehicle body, in accordance with one embodiment of the present disclosure.

As shown in FIG. 2, the rear seat assembly 102 includes a seat bench 130 arranged inside the vehicle body 104 and defining a passenger compartment 124 and a service compartment 126 inside the vehicle body 104. The passenger compartment 124 is arranged between the front end 106 and the seat bench 130 of the vehicle 100, while the service compartment 126 extends rearwardly towards the rear end 108 of the vehicle body 104 from the seat bench 130. The passenger compartment 124 provides space for sitting of the passengers inside the vehicle 100 and is accessed via a plurality of doors of the vehicle 100, while the plurality of components 200, for example, the cabin filter 202, etc., are arranged inside the service compartment 126.

Figure 3:
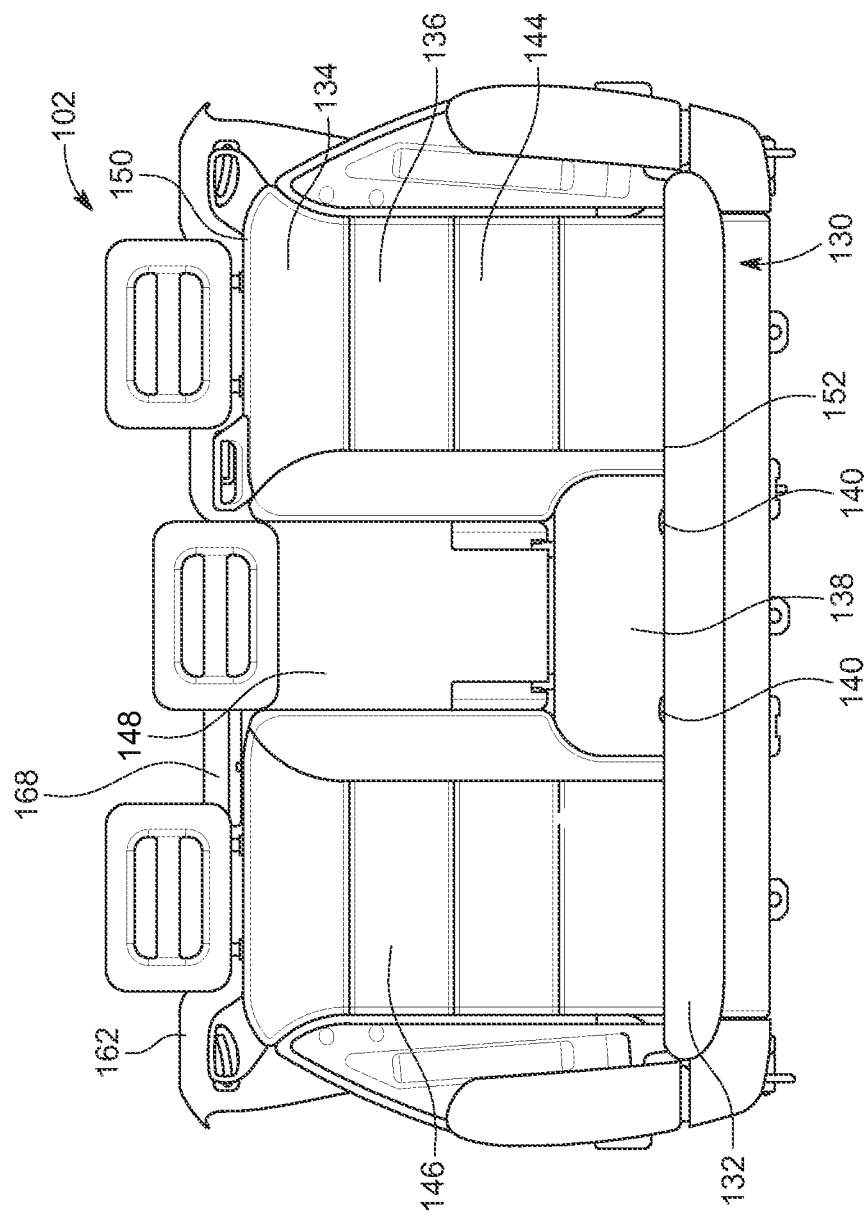
FIG. 3 is a front perspective view of the rear seat assembly of FIG. 2, in accordance with one embodiment of the present disclosure.

Further, referring to FIGS. 2 and 3, the seat bench 130 includes a seat bottom 132 fixedly attached to the floor 114 of the vehicle body 104 to support a seating of the passengers and a back support 134 for supporting backs of the passengers. As shown, the back support 134 extends vertically from the seat bottom 132 to provide a back rest for the passengers sitting on the seat bench 130. As shown, the back support 134 includes a first support panel 136 adapted to pivot between an upright position and a folded position relative to the seat bottom 132 and a second support panel 138 removably coupled to the first support panel 136 and the seat bottom 132 via a plurality of first fasteners 140, for example, bolts. In the upright position, as shown in FIG. 3, the first support panel 136 extends substantially vertically and outwardly from the seat bottom 132 and provides the lumbar support to the passengers sitting on the seat bottom 132, while in the folded position, best shown in FIGS. 8, 9, and 10, at least a portion of the first support panel 136 is arranged facing the seat bottom 132 and enables an access of the service compartment 126 from the passenger compartment 124. To retain the first support panel 136 in the upright position, the first support panel 136 is coupled to the vehicle body 104 via a plurality of second fasteners 142 (shown in FIGS. 6 and 7), such as, bolts. Accordingly, the first support panel 136 is moved to the folded position after removal of the second fasteners 142 from the first support panel 136 and the vehicle body 104. In an embodiment the first support panel 136 may be pivotally coupled to the vehicle body 104 or the seat bottom 132.

Figure 9:
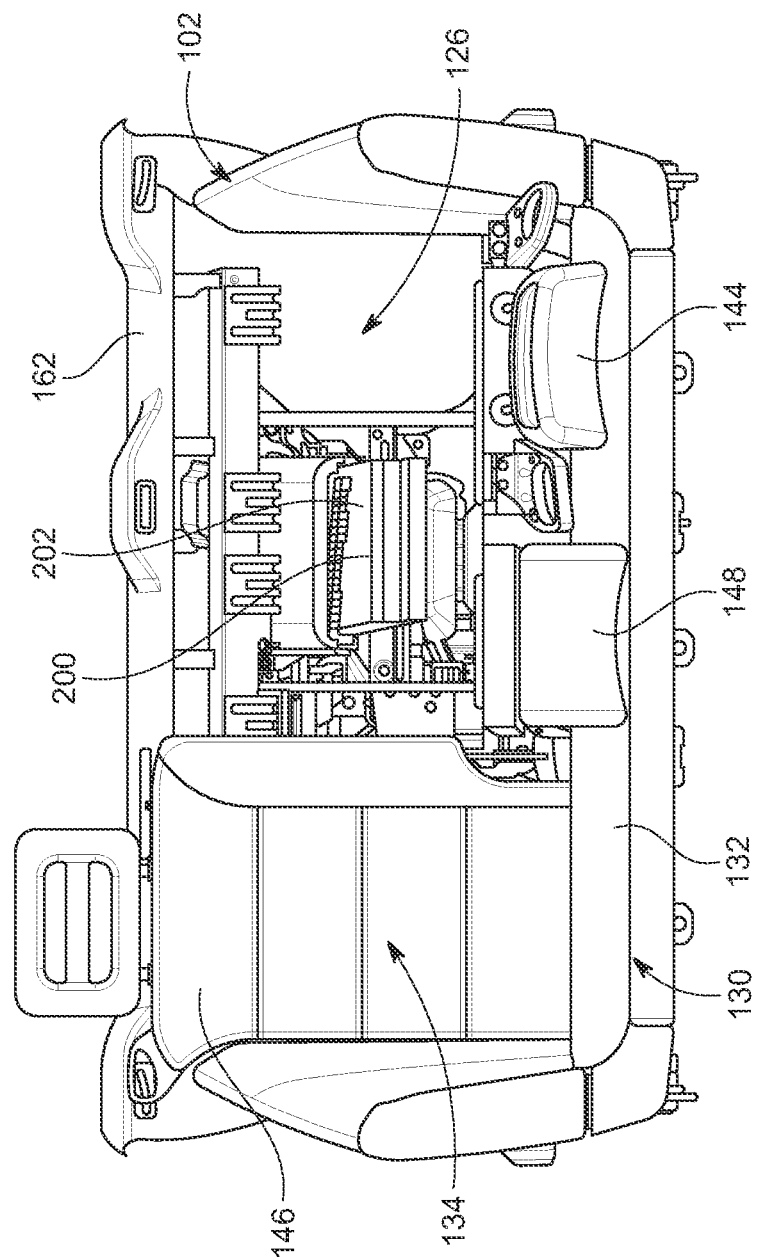
Figure 10:
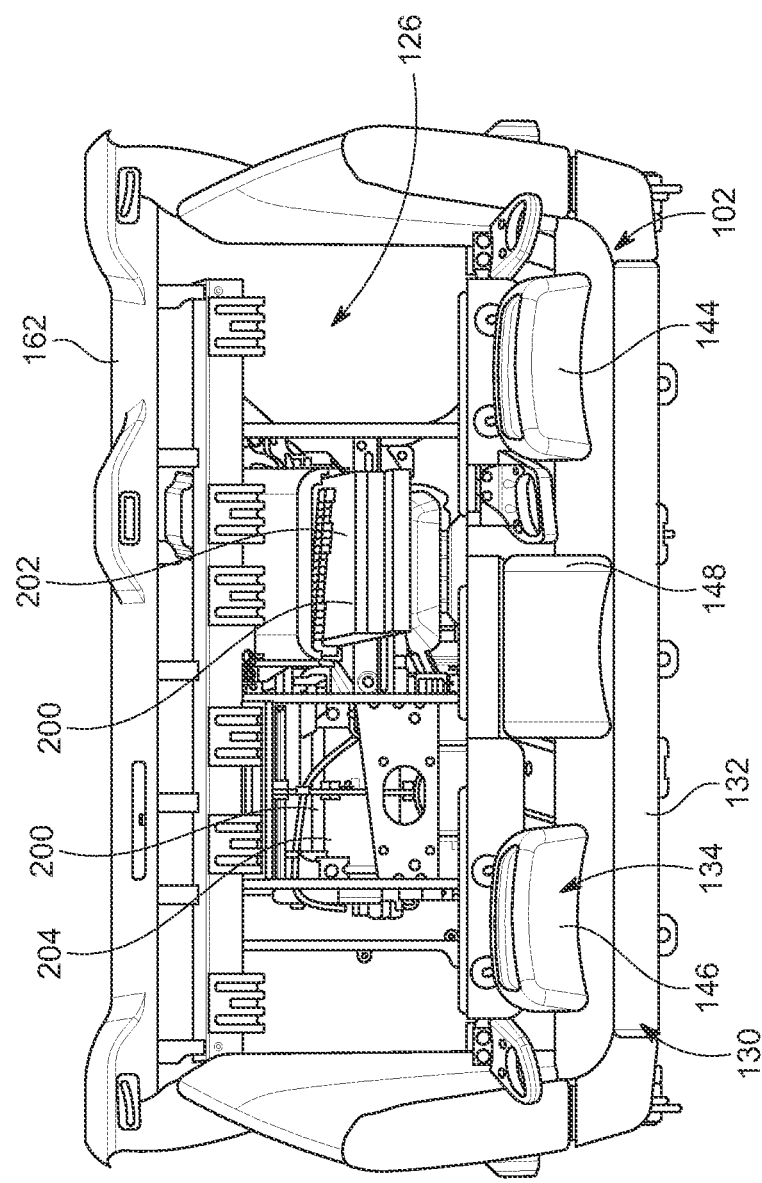

In an embodiment, the first support panel 136 includes a plurality of portions, for example, two outboard portions 144, 146 and a central portion 148 arranged between the two outboard portions 144, 146. The outboard portions 144, 146 and the central portion 148, each is adapted to pivot between a first position (i.e., upright position) and a second position (i.e., folded position) relative to the seat bottom 132. In the upright position, the central portion 148 and the outboard portions 144, 146 are arranged vertically relative to the seat bottom 132 and provide support for the back of a person sitting on the seat bench 130. Also, as shown in FIGS. 9 and 10, the components 200, for example, the battery 204, the filter 202, etc., are located behind the back support 134 of the seat bench 130 and are accessed by moving at least one of the outboard portions 144, 146 and the central portion 148 to the folded position. In the upright positions, the outboard portions 144, 146 and the central portion 148 are attached to vehicle body by using the second fasteners 142, such as, z-bolts, and may be moved to the folded position upon disengagement or removal of the associated second fasteners 142.

As shown, each of the outboard portions 144, 146 extends from an upper end 150 of the back support 134 to a lower end 152 of back support 134, while the central portion 148 extends from the upper end 150 towards the lower end 152 such that a lower edge of the central portion 148 is disposed at an offset from the lower end 152 of the back support 134. Accordingly, a cavity 156, best shown in FIG. 5) is defined between the central portion 148 and two outboard portions 144, 146 such that the cavity 156 extends from the lower end 152 of the back support 134 to the central portion 148. It may be appreciated that the second support panel 138 covers the cavity 156 when engaged with the first support panel 136 arranged in the upright position and the seat bottom 132. The cavity 156 is adapted to provide provides access to the service compartment 126 when the second support panel 138 is disengaged from the first support panel 136.

Figure 4:
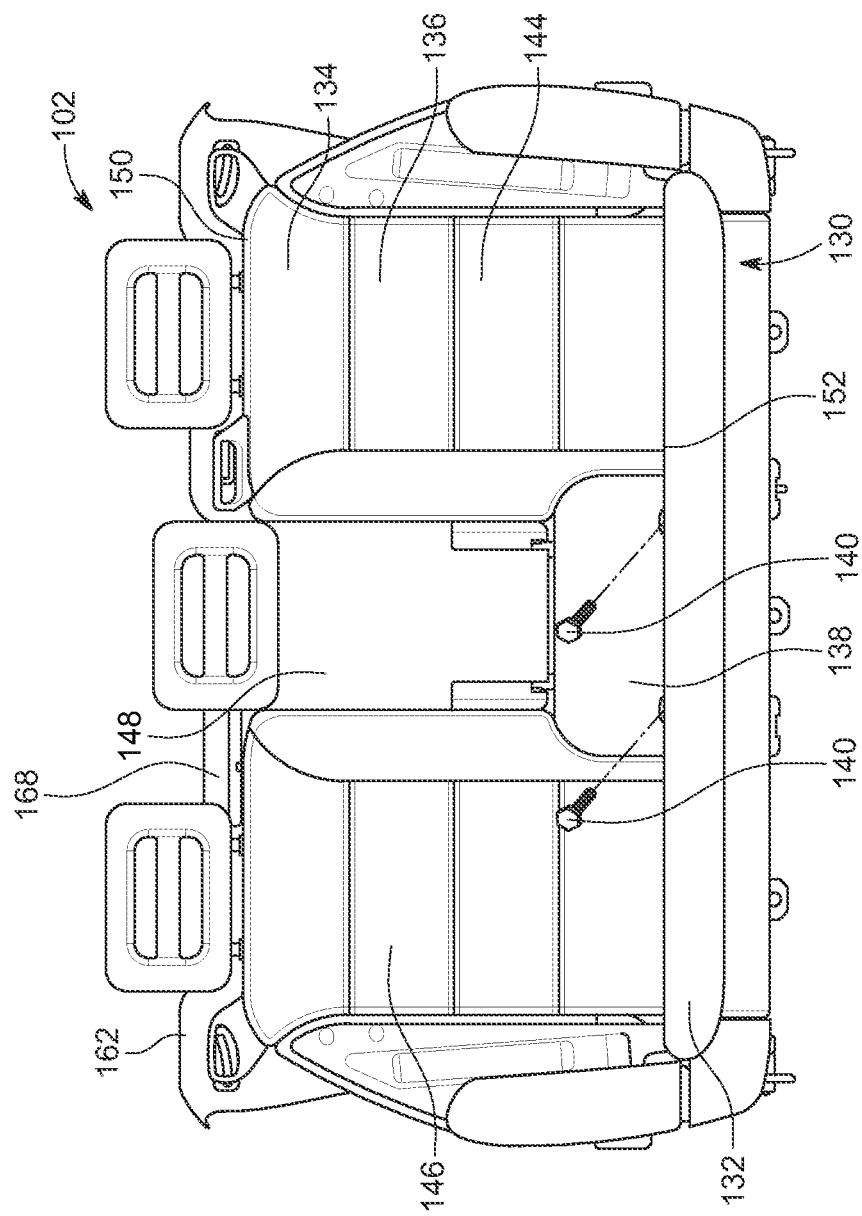
FIGS. 4-10 depicts various steps involved in accessing a plurality of components arranged inside a service compartment located rearwardly of a seat bench of the rear seat assembly, in accordance with one embodiment of the present disclosure.

As shown in FIGS. 3 and 4, while engaged with the first support panel 136, the second support panel 138 extends upwardly from the seat bottom 132 to the central portion 148 of the first support panel 136. Accordingly, the second support panel 138 is arranged substantially centrally of the back support 134 in a lateral direction. The second support panel 138 may be made of the plastic and may include complimentary grooves and tabs to facilitate the removable engagement of the second support panel 138 with the first support panel 136 and the seat bottom 132. Also, it may be appreciated that the first support panel 136 can be moved to the folded position from the upright position only after removal of the second support panel 138 from the first support panel 136 and the seat bottom 132. Accordingly, the rear seat assembly 102 acts as service door and provide access to the service compartment 126 and the components 200 arranged inside the service compartment 126 for servicing only.

Further, the vehicle 100 includes a tray 162 attached to the back support 134 and extending behind the back support 134, covering the service compartment 126 from top. As shown, the tray 162 extends in a lateral direction and extends along an entire width of the back support 134, and is arranged proximate to the upper end 150 of the back support 134. The tray 162 includes a tray cap 168 removably engaged to the back support 134 and is arranged covering an access opening 170 of the service compartment 126. In an embodiment the tray cap 168 is removably engaged with the back support 134 and may include tabs or grooves adapted to engage with the grooves or tabs of the back support 134. To access the second fasteners 142 and remove the second fasteners 142, the tray cap 168 is disengaged from the back support 134 and the tray 162.

Figure 5:
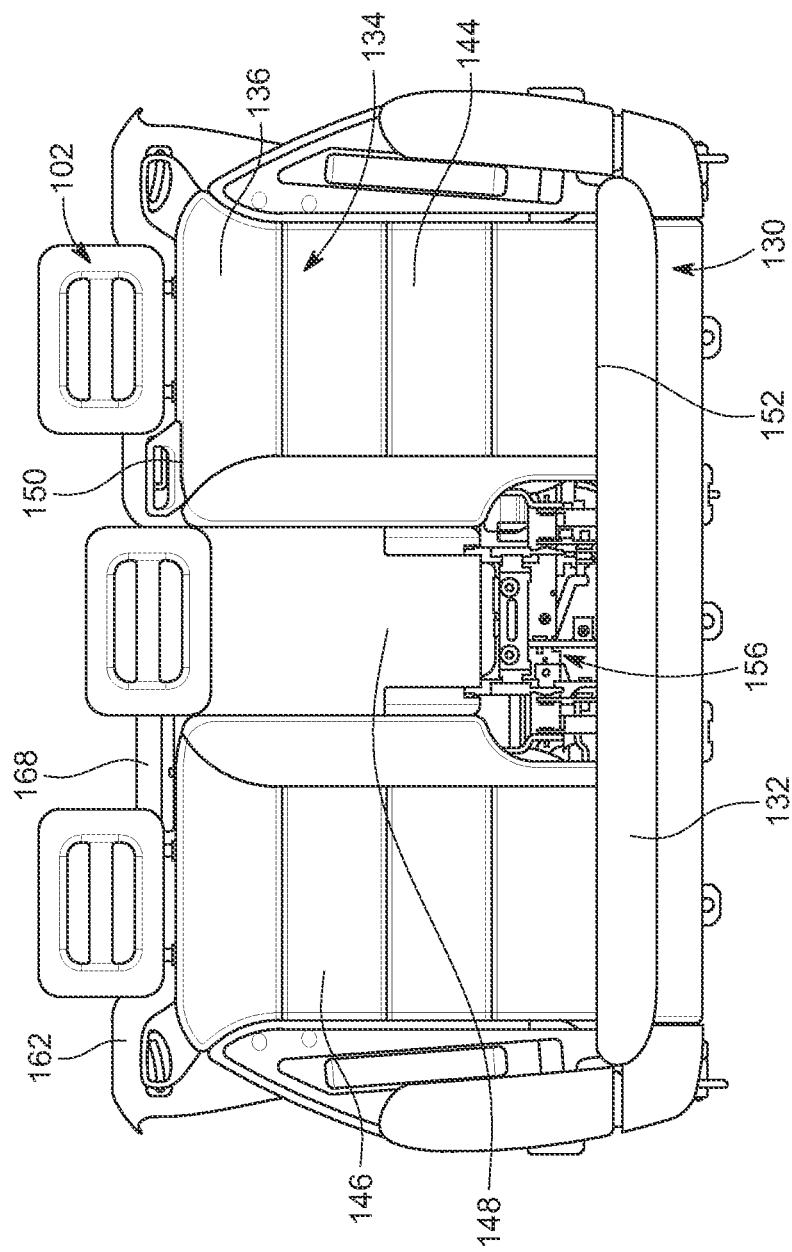
Figure 6:
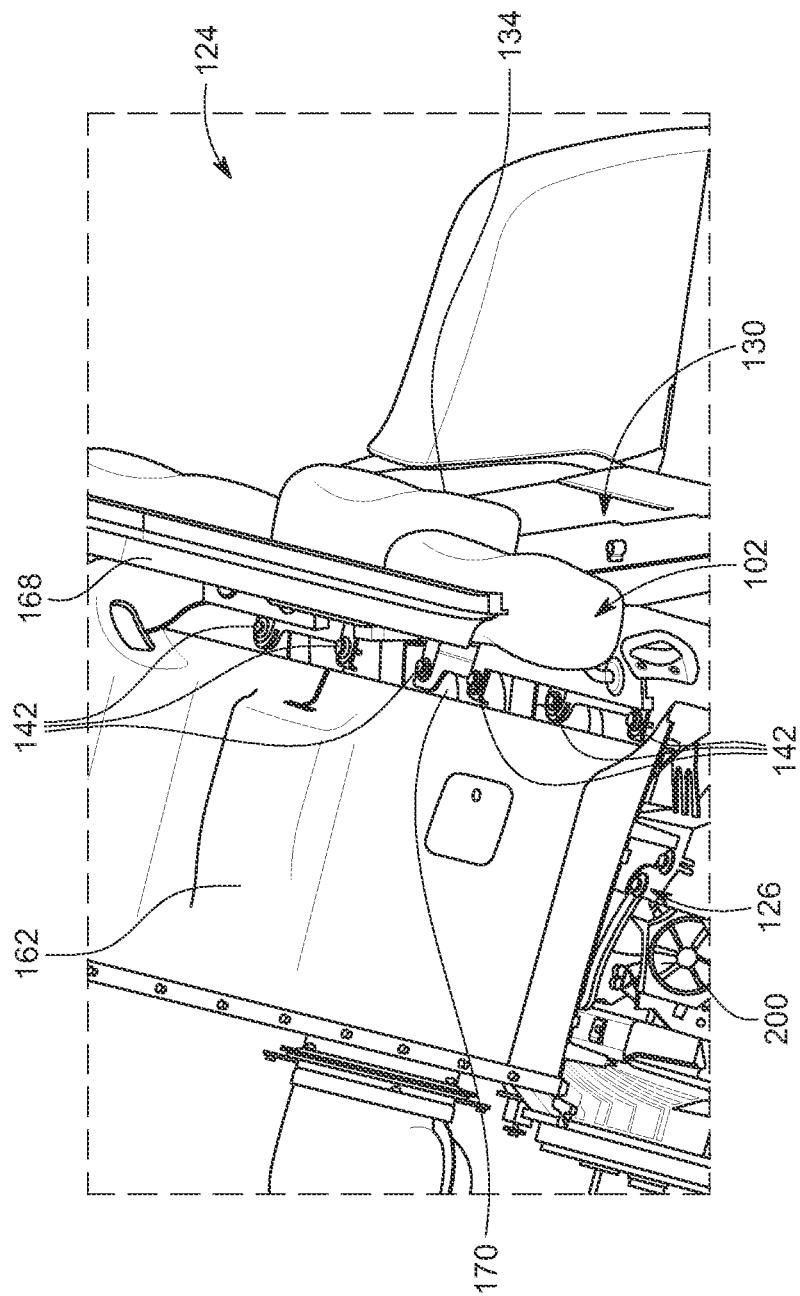
Figure 7:
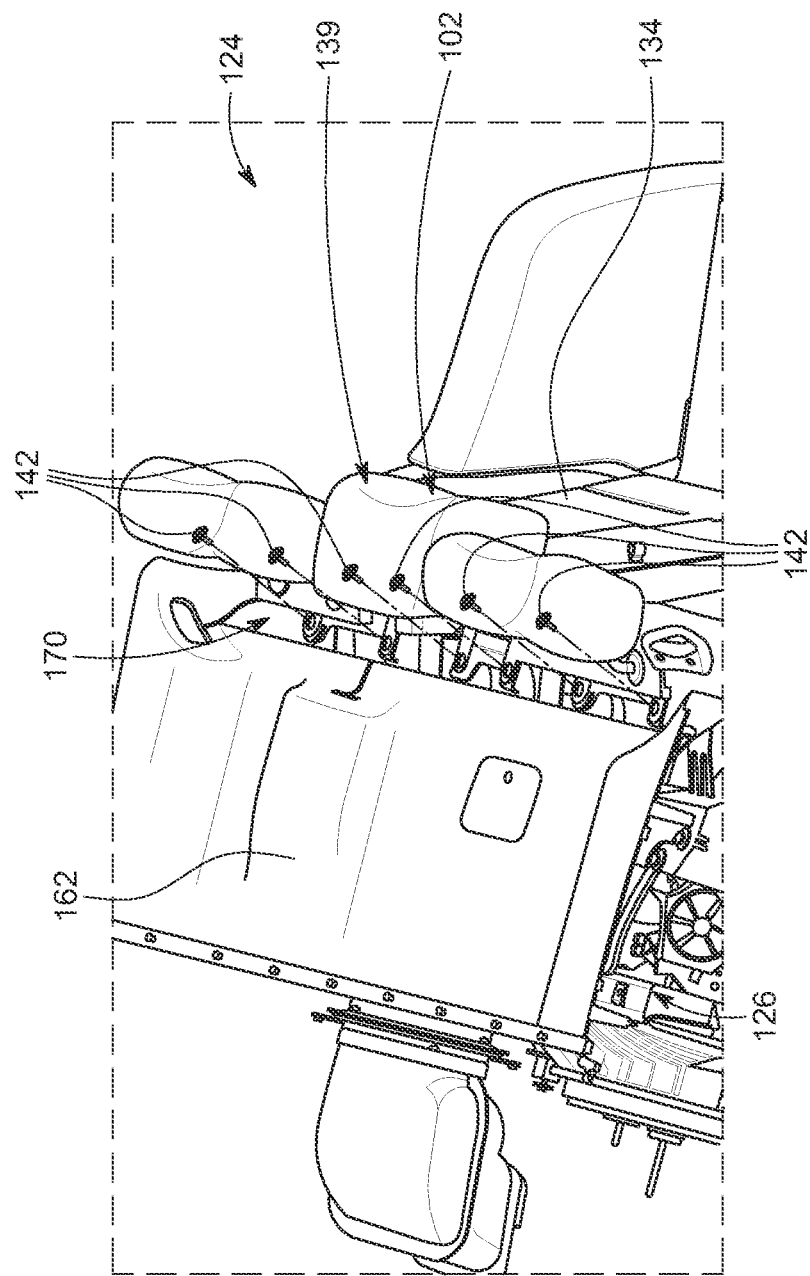
Figure 8:
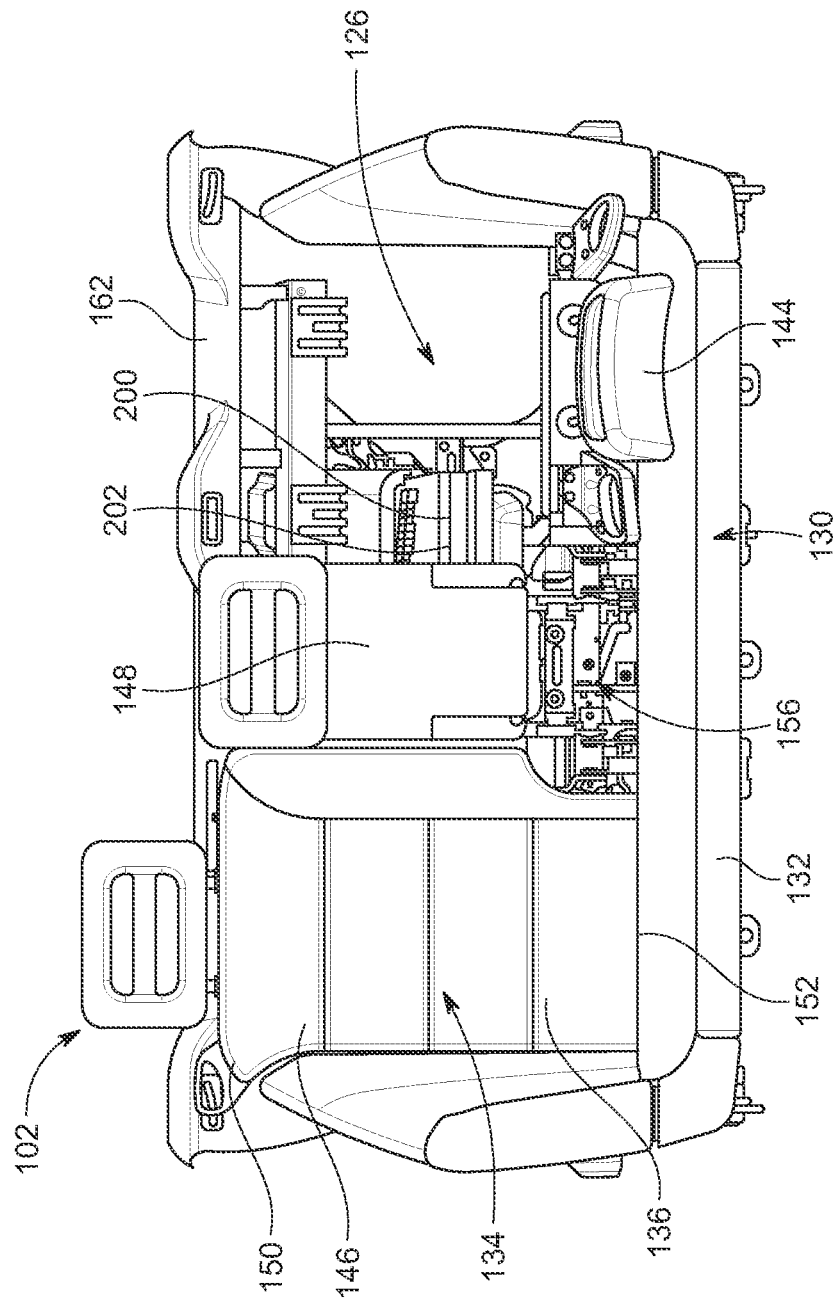

Referring to FIGS. 4 to 10, a method for accessing and servicing the one or more components 200 arranged behind the back support 134 of the rear seat assembly 102 and inside the service compartment 126 is described now. Initially, the technician removes the first fasteners 140 from the second support panel 138, the first support panel 136 and the seat bottom (as shown in FIG. 4) and removes the second support panel 138 from first support panel 136 and the seat bottom 132 (as shown in FIG. 5). After removing the second support panel 138, the technician removes the tray cap 168 by disengaging the tray 162 from the back support 134 as shown in FIG. 6. The removal of the tray cap 168 enables access of the rear of the back support 134 of the seat bench 130 through the access opening 170. Subsequently, as shown in FIG. 7, the technician may remove the second fasteners 142 connecting/attaching the first support panel 136 with the vehicle body 104, thereby disconnecting the first support panel 136 from the vehicle body 104. Upon removal of the second fasteners 142, the technician may move one of the outboard portions 144, 146, for example the outboard portion 144, to the folded position to access the components 200 arranged behind the folded outboard portion 144 as depicted in FIG. 8. Similarly, upon removal of the second fasteners 142, the technician may move the central portion 148 and/or the other outboard portion 146 to the folded position (as depicted in FIGS. 9 and 10) to access the components 200 arranged behind the central portion 148 and/or the other outboard portion 146. It may be appreciated that the outboard portions 144, 146 and the central portion 148, each can be independently moved between the upright position and the folded position without moving the others.

After performing the servicing of the components 200, for example, cleaning the cabin filter 202, the technician may arrange the components 200 at the designated positions.

Subsequently, the technician may position each of the outboard portions 144, 146 and the central portion 148 at the upright position, and engages/couples/attaches the outboard portions 144, 146 and the central portion 148 with the vehicle body 104 by engaging the second fasteners 142. Further, the technician may arrange the tray cap 168 to cover the access opening 170 and couples/engages the tray cap 168 with the back support 134. After suitably positioning and engaging the tray cap 168, the technician may arrange the second support panel 138 covering the cavity 156 and engages the second support panel 138 with the first support panel 136 and the seat bottom 132 by attaching the first fasteners 140. In this manner, the removable second support panel 138 along with the foldable outboard portions 144, 146 and the central portion 148 of the rear seat assembly 102 enables servicing of the components 200 arranged inside the service compartment 126.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seat assembly for a vehicle having a vehicle body, comprising:
    a seat bench adapted to be arranged inside the vehicle body and defining a
    passenger compartment and a service compartment inside the vehicle body, the seat bench including
    a seat bottom to facilitate a seating of a one or more passengers, and
    a back support having
        a first support panel adapted to move between an upright position and a folded position relative to the seat bottom, and
        a second support panel arranged proximate to the seat bottom and removably coupled to the first support panel and the seat bottom,
            wherein the first support panel is moved to the folded position from the upright position upon a disengagement of the second support panel from the first support panel and the seat bottom to provide an access of the service compartment;
    a plurality of first fasteners removably coupling the second support panel with the first support panel arranged at the upright position and the seat bottom;
    a plurality of second fasteners coupling the first support panel in the upright position with the vehicle body, wherein the plurality of second fasteners is disengaged from the first support panel and the vehicle body to move the first support panel to the folded position; and
    a tray extending rearwardly of the back support and covering the service compartment, wherein the tray includes a tray cap arranged proximate to the rear surface of the back support and removably engaged to the back support, wherein the tray cap is removed to facilitate a removal of the plurality of second fasteners coupling the first support panel to the vehicle body.

2. The seat assembly of claim 1, wherein the first plurality of fasteners and the second plurality of fasteners includes a plurality of bolts.

3. The seat assembly of claim 1, wherein the first support panel includes a pair of outboard portions and a central portion arranged between the outboard portions, wherein the outboard portions and the central portion are adapted to move between the upright position and the folded position independently from each other.

4. The seat assembly of claim 3, wherein the second support panel extends from the seat bottom to the central portion of the first support panel when engaged with the first support panel.

5. A vehicle, comprising:
    a vehicle body;
    a seat bench arranged inside the vehicle body and defining a passenger compartment and a service compartment inside the vehicle body, the seat bench including:
    a seat bottom to facilitate a seating of a one or more passengers, and
    a back support having:
        a first support panel adapted to move between an upright position and a folded position relative to the seat bottom, and
        a second support panel arranged proximate to the seat bottom and removably coupled to the first support panel and the seat bottom,
            wherein the first support panel is moved to the folded position from the upright position upon a disengagement of the second support panel from the first support panel and the seat bottom to access the service compartment;
    a plurality of first fasteners removably coupling the second support panel with the first support panel arranged at the upright position and the seat bottom;
    a plurality of second fasteners coupling the first support panel in the upright position with the vehicle body, wherein the plurality of second fasteners is disengaged from the first support panel and the vehicle body to move the first support panel to the folded position; and a tray extending rearwardly of the back support and covering the service compartment, wherein the tray includes a tray cap arranged proximate to the rear surface of the back support and removably engaged to the back support, wherein the tray cap is removed to facilitate a removal of the plurality of second fasteners coupling the first support panel to the vehicle body.

6. The vehicle of claim 5, wherein the first support panel includes a pair of outboard portions and a central portion arranged between the outboard panels, wherein the outboard portions and the central portion are adapted to move between the upright position and the folded position independently of each other.

7. The vehicle of claim 6, wherein the second support panel extends from the seat bottom to the central portion of the first support panel when engaged with the first support panel.

8. The vehicle of claim 5 further including a plurality of components arranged inside the service compartment.

9. The vehicle of claim 8, wherein the plurality of components includes a cabin filter of the vehicle.

10. A vehicle, comprising:
a vehicle body;
a seat bench arranged inside the vehicle body and defining a passenger compartment and a service compartment inside the vehicle body, the seat bench including
 a seat bottom to facilitate a seating of a one or more passengers, and
 a back support having
  a first support panel adapted to move between an upright position and a folded position relative to the seat bottom, and
  a second support panel arranged proximate to the seat bottom and removably coupled to the first support panel and the seat bottom;
a plurality of components arranged inside the service compartment;
a plurality of first fasteners removably coupling the second support panel with the first support panel arranged at the upright position and the seat bottom; and
a plurality of second fasteners coupling the first support panel in the upright position with the vehicle body, wherein the plurality of second fasteners is disengaged from the first support panel and the vehicle body to move the first support panel to the folded position, wherein the first support panel is moved to the folded position from the upright position after disengaging the second support panel from the first support panel and the seat bottom to access the plurality of components arranged inside the service compartment;
a tray extending rearwardly of the back support and covering the service compartment and the tray includes a tray cap removably engaged to the back support, wherein the tray cap is removed to facilitate a removal of the plurality of second fasteners coupling the first support panel to the vehicle body;
wherein the first support panel includes a pair of outboard portions and a central portion arranged between the outboard portions, wherein the outboard portions and the central portion are adapted to move between the upright position and the folded position independently of each other; and
wherein the second support panel extends from the seat bottom to the central portion of the first support panel when engaged with the first support panel and the seat bottom.

11. The vehicle of claim 10, wherein the plurality of components includes a cabin filter of the vehicle.

* * * * *